United States Patent Office 3,751,443
Patented Aug. 7, 1973

3,751,443
METHOD OF PRODUCING ACRYLONITRILE
Khachik Egorovich Khcheian, prospekt Mira 148a, kv. 19; Olga Mikhailovna Revenko, ulitsa Chkalova 48a, kv. 53; Alla Nikolaevna Shatalova, Veernaya ulitsa 34, korpus 2, kv. 14; and Eleonora Grigorievna Gelperina, Schelkovskoe shosse 44, korpus 1, kv. 19, all of Moscow, U.S.S.R.
No Drawing. Filed Aug. 26, 1970, Ser. No. 67,244
Claims priority, application U.S.S.R., Sept. 1, 1969, 1371589
Int. Cl. C07c *121/02*
U.S. Cl. 260—465.9  5 Claims

ABSTRACT OF THE DISCLOSURE

A method of producing acrylonitrile by reacting acetonitrile with a lower saturated aliphatic hydrocarbon, such as methane, in the presence of oxygen or an oxygen-containing gas at a temperature of 600–1000° C.

The present invention relates to methods of producing acrylonitrile. Acrylonitrile is used as a stock material in the production of synthetic fibers, for acrylonitrile-butadiene-styrene resins, nitrile rubber, acrylamide and acrylic esters, and also for synthesizing a number of new products.

A method of producing acrylonitrile from acetonitrile by reacting acetonitrile with formaldehyde in a vapour phase in the presence of catalysts is known in the art. The catalysts are phosphates of metals belonging to Groups I and II of the Periodic System. In this process acetonitrile is used as the starting material. Acetonitrile, in its turn, can be produced in different ways, for instance, in the course of oxidation ammonolysis of gasoline. The resuling products are acrylonitrile, propionitrile and acetonitrile, acetonitrile being the main product. Thus, the producing of such a valuable and multitonnage monomer as acrylonitrile can be fully based on gasoline which is an easily available product.

Besides, acetonitrile is formed as a by-product in the process of producing acrylonitrile by oxidation ammonlysis of propylene, in an amount of 130–150 kg. per ton of acrylonitrile.

In view of the fact that the process of oxidation ammonolysis of propylene is widely practised in industry, the problem of an efficient utilization of acetonitrile is of great economics importance. In this connection the producing of acrylonitrile from acetonitrile becomes of great practical interest.

The known method of producing acrylonitrile from acetonitrile and formaldehyde is disadvantageous because of the use of formaldehyde, whose production involves higher cost and the use of certain catalysts, which makes acrylonitrile more expensive.

The object of the present invention is to improve the method of producing acrylonitrile from acetonitrile in such a way that the producing of acrylonitrile would be still more facile and less expensive, and the process would be commercially expedient.

Said object is accomplished by the provision of a method of producing acrylonitrile, which method, according to the invention, consists in reacting acetonitrile with a saturated lower aliphatic hydrocarbon in the presence of oxygen or an oxygen-inert gas mixture as an initiating agent. The process is carried out at a temperature of 600–1000° C. and a space velocity of 1000–5000 hr.$^{-1}$, but preferably at a temperature of 700–750° C. and a space velocity of 1000–2500 hr.$^{-1}$. The process of interaction between acetonitrile and a saturated lower aliphatic hydrocarbon may be carried out under atmospheric or an elevated pressure.

The molar ratio between acetonitrile and said hydrocarbon in the initial mixture may vary from 1:2 to 1:20, preferably from 1:2 to 1:10.

Air can be used as an oxygen-inert gas mixture.

The concentration of oxygen in the initial mixture can be 1–20 vol. percent, but preferably 5–10 vol. percent.

As saturated lower aliphatic hydrocarbons use may be made of methane, ethane, butane, propane.

The reaction mixture may be diluted with inert gases, such as nitrogen, carbon dioxide, water vapour. Such a dilution ensures an easier course of the reaction.

The reaction between acetonitrile and said saturated aliphatic hydrocarbon results in the formation of not only acrylonitrile but also of propionitrile and hydrocyanic acid. More than 60% of acetonitrile are converted to acrylonitrile, 13–23%, to propionitrile and 14–20%, to hydrocyanic acid. The total yield of acrylonitrile and propionitrile exceeds 75%, and conversion of acetonitrile during one pass reaches 20%.

Propionitrile is easily dehydrated to acrylonitrile, and therefore it can be converted to acrylonitrile by dehydration in a separate apparatus, or recycled to the process.

Thus, the present process of producing acrylonitrile is based on the interaction between easily available reactants, namely, acetonitrile and a saturated lower aliphatic hydrocarbon, such as methane, ethane, butane, propane, and does not require the use of a catalyst. The process is simple to practice and therefore it will find wide application in industry.

Given hereinbelow are examples illustrating specific embodiments of the herein-proposed method.

EXAMPLE 1

A mixture of acetonitrile, methane and oxygen in a molar ratio of 1:4:0.465 (the content of oxygen in the mixture being 8.5 vol. percent) is passed through a silica reactor with the inner diameter of 20 mm. and the length of the reaction zone of 14 cm., with the space velocity of 1370 hr.$^{-1}$ at a temperature of 750° C. The yield for the reacted acetonitrile: acrylonitrile, 49.1%, propionitrile, 22.1%, hydrocyanic acid, 25.2%.

Conversion of acetonitrile, 16.9%.

EXAMPLE 2

A mixture of acetonitrile, methane and oxygen in a molar ratio of 1:5:0.465 (the content of oxygen in the mixture being 6.2 vol. percent) is passed through the reactor as specified in Example 1, with the space velocity of 1500 hr.$^{-1}$ at a temperature of 700° C.

The yield for the reacted acetonitrile: acrylonitrile, 43.9%, propionitrile, 30.7%, hydrocyanic acid, 25.2%

Conversion of acetonitrile, 7.9%.

EXAMPLE 3

A mixture of acetonitrile, methane and oxygen in a molar ratio of 1:1:0.22 (the content of oxygen in the mixture being 10 vol. percent) is passed through the reactor specified in Example 1 at a temperature of 774° C. and with the space velocity of 1120 hr.$^{-1}$.

The yield for the reacted acetonitrile: acrylonitrile, 62.5%, propionitrile, 13.2%, hydrocyanic acid, 24.3%.

Conversion of acetonitrile, 10.6%.

EXAMPLE 4

A mixture of acetonitrile, methane and oxygen in a molar ratio of 1:1:0.34 (the content of oxygen in the mixture being 14.3 vol. percent) is passed through the reactor specified in Example 1 at a temperature of 775° C. and with the space velocity of 1150 hr.$^{-1}$.

The yield for the reacted acetonitrile:acrylonitrile, 56% propionitrile, 14.2%, hydrocyanic acid, 29.9%.
Conversion of acetonitrile, 17.6%.

EXAMPLE 5

A mixture of acetonitrile, methane and oxygen in a molar ratio of 1:1:0.47 (the content of oxygen in the mixture being 19 vol. percent) is passed through the reactor specified in Example 1 at a temperature of 725° C. and with the space velocity of 1170 hr.$^{-1}$.

The yield for the reacted acetonitrile:acrylonitrile, 40.7%, propionitrile, 21.1%, hydrocyanic acid, 38.2%.
Conversion of acetonitrile, 13%.

EXAMPLE 6

A mixture of acetonitrile, methane and oxygen in a molar ratio of 1:3:0.62 (the content of oxygen in the mixture being 13.5 vol. percent) is passed through the reactor specified in Example 1 at a temperature of 775° C. and with the space velocity of 2150 hr.$^{-1}$.

The yield for the reacted acetonitrile:acrylonitrile, 51.5%, propionitrile, 24.1%, hydrocyanic acid, 14.5%.
Conversion of acetonitrile, 13.2%.

EXAMPLE 7

A mixture of acetonitrile, methane and oxygen in a molar ratio of 1:3:0.78 (the content of oxygen in the mixture being 16.3 vol. percent) is passed through the reactor specified in Example 1 at a temperature of 775° C. and with the space velocity of 2200 hr.$^{-1}$.

The yield for the reacted acetonitrile:acrylonitrile, 49.5%, propionitrile, 26.4%, hydrocyanic acid, 21.6%.
Conversion of acetonitrile, 13.4%.

EXAMPLE 8

A mixture of acetonitrile, methane and oxygen in a molar ratio of 1:0.52:0.16 (the content of oxygen in the mixture being 10 vol. percent) is passed through the reactor specified in Example 1 at a temperature of 775° C. and with the space velocity of 1630 hr.$^{-1}$.

The yield for the reacted acetonitrile:acrylonitrile, 61.4%, propionitrile, 7.8%, hydrocyanic acid, 30.8%.
Conversion of acetonitrile, 11.4%.

EXAMPLE 9

A mixture of acetonitrile, ethane and oxygen, in a molar ratio of 1:1:0.22 (with the content of oxygen in the mixture equal to 10 vol. percent) is passed through the silica reactor described in Example 1, at a temperature of 800° C. and with the space velocity of 1140 hr.$^{-1}$.

The yield for the reacted acetonitrile:acrylonitrile, 33.5%, propionitrile, 17.3%, hydrocyanic acid, 26.8%.

EXAMPLE 10

A mixture of acetonitrile, methane, butane and oxygen in a molar ratio of 1:0.9:0.1:0.22 (the content of oxygen in the mixture being 10 vol. percent) is passed through the silica reactor described in Example 1 at a temperature of 750° C. and with the space velocity of 1130 hr.$^{-1}$.

The yield of acrylonitrile is 20.5%, propionitrile, 8.5%, hydrocyanic acid, 28%.
Conversion of acetonitrile, 13%.

EXAMPLE 11

A mixture of acetonitrile, propane and oxygen in a molar ratio of 1:1:0.32 (the content of oxygen in the mixture being 13.4 vol. percent) is passed through the silica reactor described in Example 1 at a temperature of 750° C. and with the space velocity of 3000 hr.$^{-1}$.

The yield of acrylonitrile is 48.2%, propionitrile, 17.6%, hydrocyanic acid, 34%.
Conversion of acetonitrile is 8%.

What is claimed is:

1. A method of producing acrylonitrile from acetonitrile which comprises reacting acetonitrile with a hydrocarbon selected from the group consisting of methane, ethane, propane, and butane, in the absence of a catalyst and in the presence of oxygen or a mixture of oxygen and a gas which is inert to the reactants, at a temperature of from 600° C. to 1,000° C. and a space velocity of from 500 to 5,000 hr.$^{-1}$, the content of said oxygen being 1–20% by volume, and the molar ratio of said acetonitrile to said hydrocarbon is from 1:2 to 1:20.

2. The method of claim 1 wherein the reaction is carried out at a temperature of from 700° C. to 775° C. and a space velocity of from 1,000 to 2,500 hr.$^{-1}$.

3. The method of claim 1 wherein the reaction is carried out at an acetonitrile-to-saturated lower aliphatic hydrocarbon molar ratio of from 1:2 to 1:10.

4. The method of claim 1 wherein the content of oxygen in the reaction mixture is 5 to 10% by volume.

5. The method of claim 1 wherein the inert gas is selected from the group consisting of nitrogen and steam.

References Cited
UNITED STATES PATENTS

| | | | |
|---|---|---|---|
| 2,481,826 | 9/1949 | Cosby | 260—465.3 |
| 3,449,399 | 6/1969 | Evans et al. | 260—465.9 |
| 3,141,034 | 6/1964 | Krebaum | 260—465.3 X |
| 2,554,482 | 5/1951 | Brown | 260—465.9 |
| 2,734,909 | 2/1956 | Gee, Jr., et al. | 260—465.9 |
| 3,472,890 | 10/1969 | Evans et al. | 260—465.3 X |
| 3,546,268 | 12/1970 | Ikeda et al. | 260—465.3 |
| 3,634,487 | 1/1972 | Khcheian et al. | 260—465.9 |

JOSEPH P. BRUST, Primary Examiner